United States Patent
Nakagawa et al.

(10) Patent No.: US 7,755,990 B2
(45) Date of Patent: Jul. 13, 2010

(54) INFORMATION RECORDING DEVICE, INFORMATION RECORDING METHOD, AND INFORMATION RECORDING PROGRAM

(75) Inventors: Hidenori Nakagawa, Saitama (JP); Yoshio Sasaki, Saitama (JP); Toshifumi Harada, Saitama (JP)

(73) Assignee: Pioneer Corporation, Tokyo (JP)

( * ) Notice: Subject to any disclaimer, the term of this patent is extended or adjusted under 35 U.S.C. 154(b) by 698 days.

(21) Appl. No.: 11/631,505

(22) PCT Filed: Jun. 30, 2005

(86) PCT No.: PCT/JP2005/012038

§ 371 (c)(1),
(2), (4) Date: Mar. 5, 2007

(87) PCT Pub. No.: WO2006/006411

PCT Pub. Date: Jan. 19, 2006

(65) Prior Publication Data

US 2008/0298185 A1 Dec. 4, 2008

(30) Foreign Application Priority Data

Jul. 7, 2004 (JP) ............................. 2004-200246

(51) Int. Cl.
*G11B 7/125* (2006.01)
(52) U.S. Cl. ..................................... 369/47.5; 369/116
(58) Field of Classification Search .................... None
See application file for complete search history.

(56) References Cited

U.S. PATENT DOCUMENTS

| | | | |
|---|---|---|---|
| 5,539,720 A | | 7/1996 | Aoi |
| 6,222,814 B1 * | | 4/2001 | Ichimura .................... 369/116 |
| 2003/0002409 A1 * | | 1/2003 | Morishima ............... 369/47.39 |
| 2005/0025018 A1 * | | 2/2005 | Hsu et al. ................. 369/53.26 |
| 2005/0083828 A1 * | | 4/2005 | Chen .......................... 369/116 |

FOREIGN PATENT DOCUMENTS

| | | |
|---|---|---|
| EP | 0364213 | 10/1989 |
| JP | 02-103741 | 4/1990 |
| JP | 10-154339 | 6/1998 |

* cited by examiner

*Primary Examiner*—Christopher R Lamb
(74) *Attorney, Agent, or Firm*—Young & Thompson

(57) ABSTRACT

Accurate calibration of recording power is performed without exceeding a rated output value of a laser diode even if recording speed is increased and high recording power is required. An information recording apparatus records information on an information recording medium such as a DVD-R/RW or a DVD+R/RW by applying a laser light onto the information recording medium. A pickup has a laser light source. A light receiving unit for detecting the amount of light by receiving the laser light emitted from the laser light source is provided, and the power of the laser light is controlled based on the power of the detected laser light. Before the actual information recording, a test emission is performed during calibration to determine an adequate recording power, and the emission duty of the laser light is controlled within the range not exceeding the rated output value of the laser light source.

8 Claims, 7 Drawing Sheets

DISTORTION RATIO = (B/A) × 100 (%)

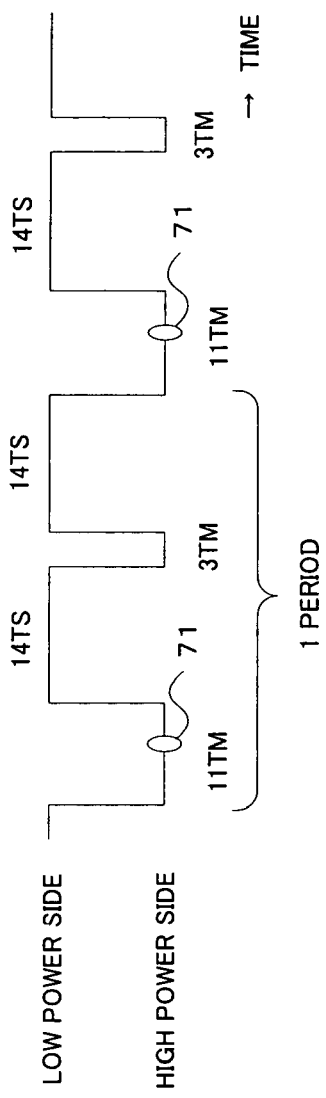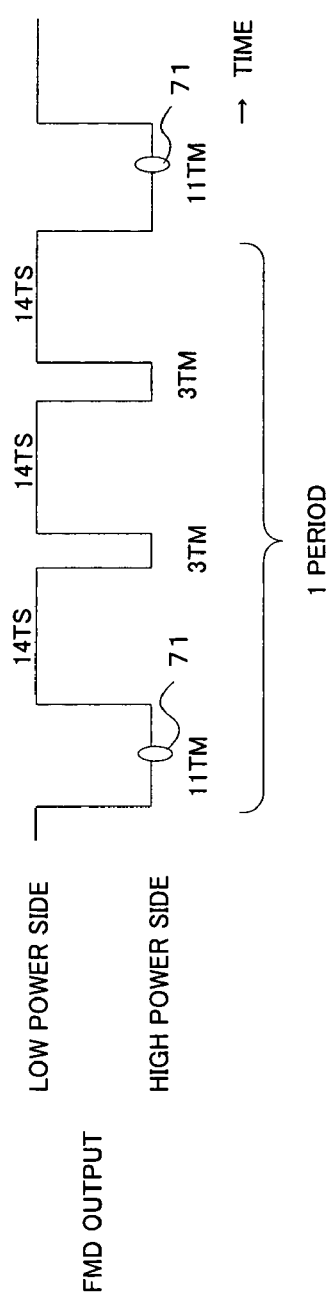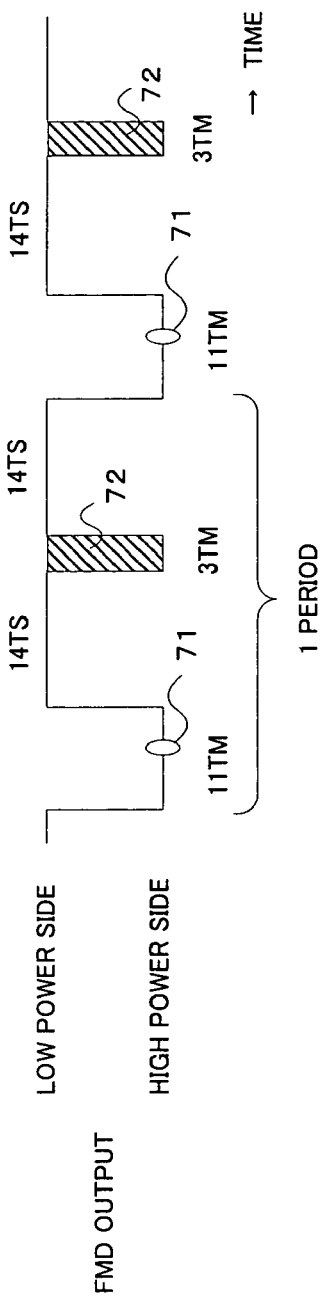

INFORMATION RECORDING DEVICE, INFORMATION RECORDING METHOD, AND INFORMATION RECORDING PROGRAM

TECHNICAL FIELD

The present invention relates to a method of recording information onto an information recording medium such as an optical disc.

BACKGROUND TECHNIQUE

As an information recording medium capable of optically recording information, there is known a DVD-R/RW for example, and there exists an information recording apparatus for recording the information onto the information recording medium. Such the information recording apparatus is also called "drive apparatus". At the time of information recording, the drive apparatus irradiates, onto the information recording medium, a recording light such as a laser light with an appropriate recording power, and forms pits correspondent to the recording information onto the recording surface of the information recording medium. Therefore, for precise information recording, it is necessary that the recording light of an appropriate recording power is maintained.

On the disc such as a CD-R/RW, the DVD-R/RW and a DVD+R/RW, information, such as an optimum recording power value and a recording power ratio for performing the precise recording onto the recording medium, is prerecorded. It is noted that the recording power ratio is a ratio of plural levels in a laser driving waveform (also referred to as "strategy") at the time of recording the information. Therefore, the drive apparatus performs calibration of a power of the laser light emitted from a laser light source before actual information recording onto the information recording medium. At this time, by a normal method, management of emission duty of the laser waveform emitted from the laser light source at the time of the calibration is not particularly performed.

However, it is necessary that the power of the laser light emitted from the laser diode serving as the laser light source is increased at the time of high-speed recording. Therefore, some laser emission waveforms used at the time of the calibration may problematically become larger than a rated output value of the laser diode.

DISCLOSURE OF INVENTION

The present invention has been achieved in order to solve the above problems. It is an object of this invention to provide an information recording apparatus, an information recording method and an information recording program, capable of performing accurate calibration of a recording power without exceeding a rated output value of a laser diode even when recording speed becomes high and thus a high recording power is necessary.

According to one aspect of the present invention, there is provided an information recording apparatus including: a pickup which includes a laser light source; a light receiving unit which receives a laser light emitted from the laser light source and detects light receiving amount; a power control unit which controls a power of the laser light based on the light receiving amount; a test emission unit which executes test emission of the laser light before actual information recording; and a duty control unit which controls emission duty of the laser light within a range smaller than a rated output value of the laser light source at the time of the test emission.

The above information recording apparatus irradiates the laser light onto the information recording medium such as the DVD-R/RW and the DVD+R/RW to record information thereon. The pickup includes a laser element such as the laser diode (LD) as the laser light source. The above information recording apparatus further includes the light receiving unit, such as a front monitor diode (FMD), which receives the laser light emitted from the laser light source and detects the light receiving amount. Based on the power of the laser light detected by the light receiving unit, the power of the laser light emitted from the laser light source is controlled. In addition, before the actual information recording, the test emission is performed in order to determine the accurate recording power. At the time of the test emission, the emission duty of the laser light is controlled within the range smaller than the rated output value of the laser light source.

"Emission duty of the laser light" indicates a ratio between a period for emitting the laser light and a period for emitting no laser light, which is equal to a ratio between an ON period and an OFF period in the emission waveform of the laser light. Therefore, even when the laser light power is heightened at the time of the test emission in high-speed recording, the test emission can be performed within the range of the rated output value of the laser diode included in the laser light source.

In a manner of the above information recording apparatus, the duty control unit may control the emission duty of the laser light within a range smaller than substantial recording power duty being the emission duty of the laser light at the time of recording actual recording data. In this manner, the test emission is executed within the range of the substantial recording power duty. "Substantial recording power duty" is the emission duty of the laser light when the actual recording data is recorded onto the information recording medium. Thus, the laser element can be more safely driven.

In another manner of the above information recording apparatus, the duty control unit may control the emission duty of the laser light at each recording speed. Since the power of the laser light to be emitted from the laser light source and a time interval thereof are different in accordance with the recording speed, it is preferable that the emission duty of the laser light is controlled at each recording speed.

In a manner of the above information recording apparatus, the duty control unit may control the emission duty of the laser light by controlling an emission pattern of the laser light. In a preferred example, the duty control unit may generate the emission pattern by a combination of data length of actual recording data. The data length of the actual recording data indicates 3 T–11 T and 14 T in the DVD-R, for example. The emission pattern is generated by the combination of the data length of the actual recording data, and based on it, the test emission is performed. Thereby, the difference with the actual recording can be reduced.

In the above example, as the emission duty is set to a smaller value, the duty control unit may preferably use a combination including short data length. By using the short data length, the emission duty of the laser light can be small.

In a preferred example of the above information recording apparatus, the power control unit may include a hold circuit for holding a level of the light receiving amount, and the duty control unit may use a combination including data length in which the hold circuit can hold the level. By using the short data length, the emission duty of the laser light can be small. However, when the data length is too short, the laser light power at this time cannot be detected by the hold circuit. Thus, it becomes necessary that the data length in which the hold circuit can hold the level is used.

According to another aspect of the present invention, there is provided an information recording method executed in an information recording apparatus including a pickup which includes a laser light source; and a light receiving unit which receives a laser light emitted from the laser light source and detects light receiving amount, including: a power control process which controls a power of the laser light based on the light receiving amount; and a test emission process which executes test emission of the laser light before actual information recording, wherein the test emission process controls emission duty of the laser light within a range smaller than a rated output value of the laser light source.

By this method, since the emission duty of the laser light is controlled within the range smaller than the rated output value of the laser light source at the time of the test emission, the structure of the power of the laser light can be also safely and stably performed, particularly even in the case of the test emission in the high-speed recording.

According to still another aspect of the present invention, there is provided a computer readable information recording program executed in an information recording apparatus including a pickup which includes a laser light source; a light receiving unit which receives a laser light emitted from the laser light source and detects light receiving amount; and a computer, making the computer function as: a power control unit which controls a power of the laser light based on the light receiving amount; a test emission unit which executes test emission of the laser light before actual information recording; and a duty control unit which controls emission duty of the laser light within a range smaller than a rated output value of the laser light source at the time of the test emission.

By executing the information recording program on the information recording apparatus including the computer, the above information recording apparatus can be realized.

BRIEF DESCRIPTION OF THE DRAWINGS

FIGS. 6A to 6C are waveforms showing examples of a light waveform for calibration.

Figure 1:
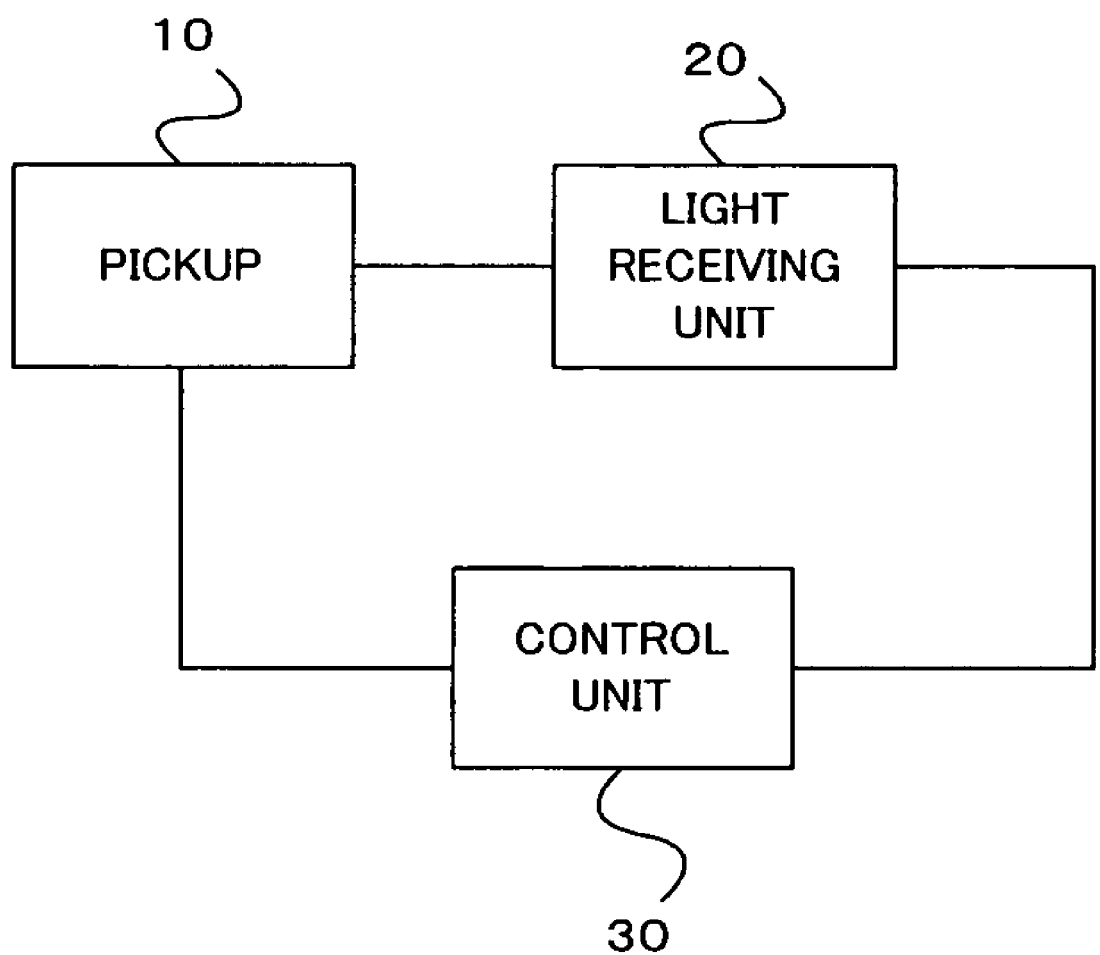
FIG. 1 is a block diagram schematically showing a main configuration of an information recording apparatus according to the present invention.

BRIEF DESCRIPTION OF THE REFERENCE NUMBER 1 and 10 Information recording apparatuses
2 Optical disc
3 Spindle motor
6 Servo control unit
10 Pickup
11 LD driver
13 LD
21 FMD
31 Recording power detecting unit
32 System control unit
34 Storing unit

DETAILED DESCRIPTION OF THE PREFERRED EMBODIMENTS

The preferred embodiment of the present invention will now be described below with reference to the attached drawings.

[Schematic Configuration]

FIG. 1 is a functional block showing a main configuration of the information recording apparatus according to the embodiment of the present invention. In FIG. 1, an information recording and reproduction apparatus 1 of this embodiment includes a pickup 10 for irradiating the laser light onto the information recording medium such as the optical disc, a light receiving unit 20 for receiving the laser light emitted from the pickup 10 and a control unit 30 for detecting the power of the laser light received by the light receiving unit 20 and calibrating the power of the laser light emitted from the pickup 10 to be the optimum power.

The above-mentioned information recording apparatus thus constructed irradiates, onto the information recording medium such as a DVD-R/RW, a DVD+R/RW and a CD-R/RW, the laser light from the pickup 10 to record the information. In addition, at the time of power calibration of the laser light, the laser light emitted from the pickup 10 is received by the light receiving unit 20. The control unit 30 detects the level of the received laser light and adjusts the power of the laser light so that the detected level becomes a predetermined level.

[Configuration of Information Recording Apparatus]

Figure 2:
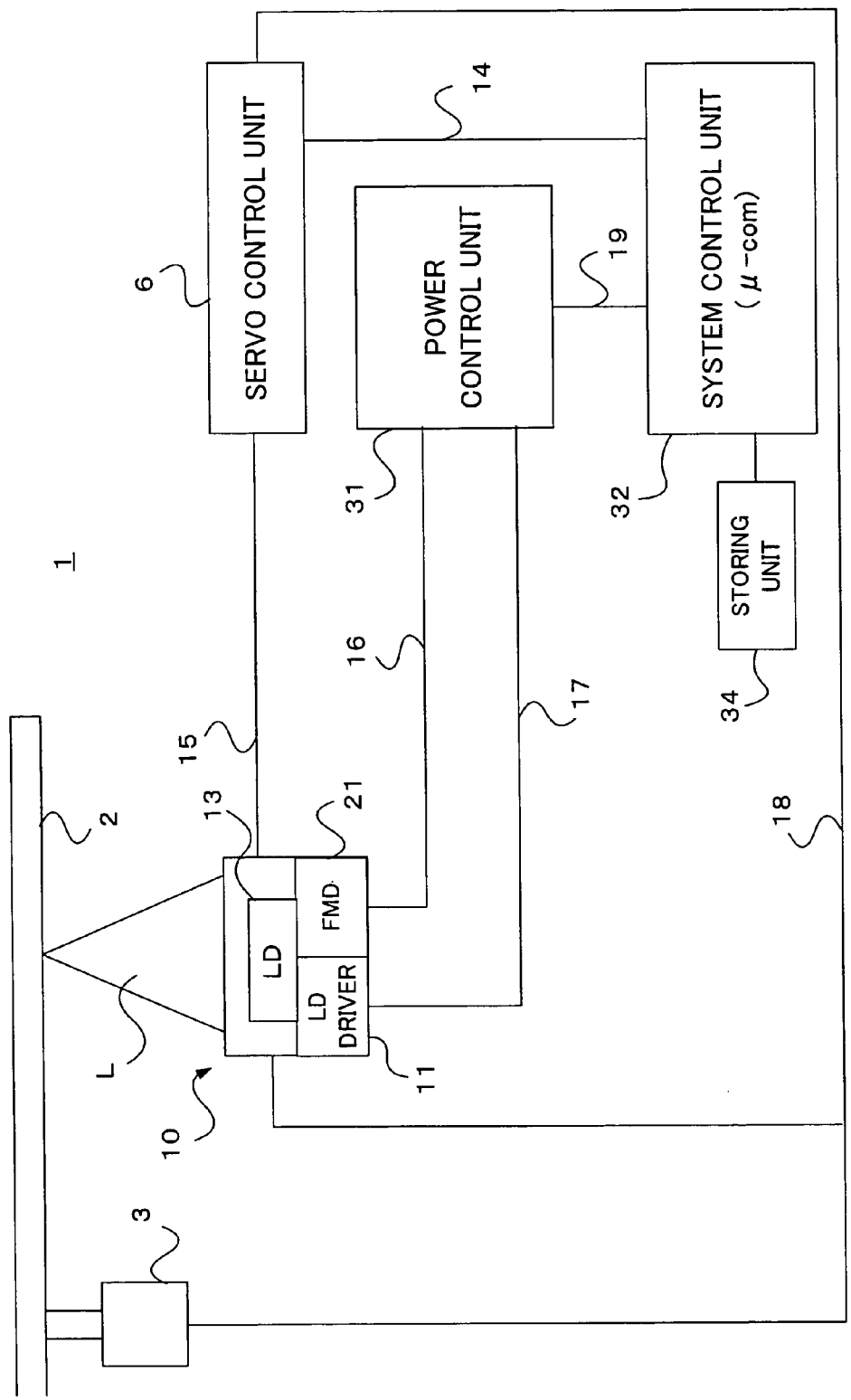
FIG. 2 is a block diagram showing a configuration of the information recording apparatus according to an embodiment.

FIG. 2 shows the configuration of the information recording apparatus according to the present invention. In FIG. 2, the information recording apparatus 1 records the information onto an optical disc 2 such as the CD-R/RW, the DVD-R/RW and the DVD+R/RW, and includes a spindle motor 3, the pickup 10, a servo control unit 6, a power control unit 31, a system control unit 32 and a storing unit 34.

The spindle motor 3 rotates the optical disc 2 at the predetermined speed based on a servo control signal 18 supplied from the servo control unit 6. The pickup 10 includes an LD (Laser Diode) 13 serving as a light source of the recording light, an LD driver 11 driving the LD 13, a front monitor diode (FMD) 21 functioning as the light receiving unit and an optical system (not shown). The LD driver 11 supplies a driving current to the LD 13 based on an LD control signal 17 supplied from the power control unit 31, and makes the LD 13 emit a laser light L for recording and erasing the information via the optical system.

In addition, the pickup 10 receives the laser light reflected by the optical disc 2 by the light detector (not shown), and generates a light detecting signal 15 being the electrical signal correspondent to the light amount to output it to the servo control unit 6.

Based on the light detecting signal 15, the servo control unit 6 executes various servo control, such as the tracking servo, the focus servo and the spindle servo. Concretely, the servo control unit 6 is controlled by the control signal 14 from the system control unit 32. The servo control unit detects various kinds of servo errors based on the light detecting signal 15, and generates the servo control signal 18 to supply it to the pickup 10 and the spindle motor 3, thereby to execute various kinds of servo controls.

The FMD 21 receives the laser light emitted from the LD 13, and generates a laser power detecting signal 16 correspondent to the light amount to supply it to the power control unit 31. The power control unit 31 includes a sample hold circuit, a peak hold circuit or a bottom hold circuit and the like, for example. The recording power detecting unit 31 detects the laser power at a predetermined timing from the laser power detecting signal 16 to supply it to the system control unit 32 as a detected laser power value 19. In addition, the power control unit 31 controls the LD driver 11 under the control of the system control unit 32 so that the laser light power becomes a desired value.

The storing unit 34, including a non-volatile storage element, stores information of calibration data at a manufacturing time and information about a state at the time of the operation, and supplies them to the system control unit 32 as need arises.

The system control unit 32, including a micro computer, reads or writes the calibration data from or onto the storing unit 34 as the need arises in order to optimally record the information onto the optical disc 2. In addition, the system control unit 32 controls the servo control unit 6, the power control unit 31 and other control units (not shown) to control the operation of the information recording apparatus 1.

[Laser Light Waveform]

Figure 3A:
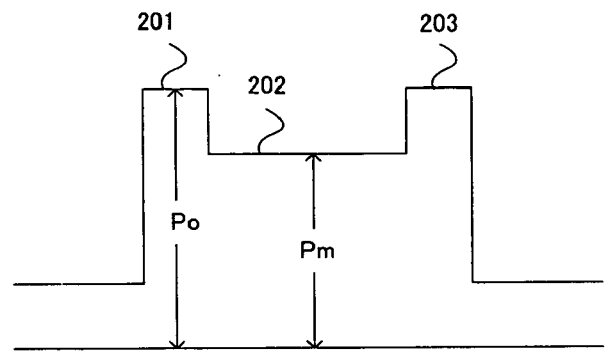
FIGS. 3A and 3B are diagrams explaining an example of a light waveform for information recording and a definition of a deterioration ratio.

When the information is recorded onto the optical disc, it is necessary to appropriately control the recording speed, the emission timing of the laser light corresponding to the optical disc and the recording power of the laser light. FIG. 3A shows an example of a substantially concave (( 凹 )) shaped laser light waveform including a top pulse 201, an intermediate pulse portion 202 and a last pulse 203, as an example of the emission pattern of the laser light at the time of the recording. In this embodiment, when it is prescribed that the levels of the recording powers of the top pulse 201 and the last pulse 203 are Po and the level of the recording power of the intermediate pulse portion 202 is Pm, a ratio Po/Pm is referred to as "recording power ratio" or "Po/Pm ratio".

The optimum value (referred to as "optimum recording power ratio (Pr)" of the Po/Pm ratio is recorded on each of the optical discs at the time of shipment from a factory, for example. Therefore, in this embodiment, the power control unit 31 controls the power of the laser light emitted from the LD 13 so that the recording power ratio Po/Pm obtained from the laser light waveform of the laser light actually emitted from the LD 13 coincides with the optimum recording power ratio: Pr=Po/Pm. The laser light waveform shown in FIG. 3A is only one example of the laser light waveform for recording used for the information recording. Needless to say, the present invention is applicable to an optical disc using various kinds of laser light waveforms for recording, other than this.

Figure 3B:
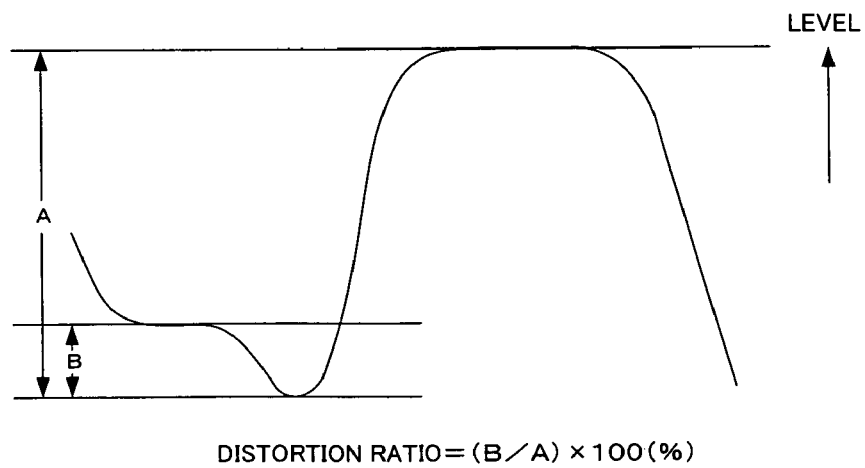

In addition, the distortion ratio of the recording waveform is defined as shown in FIG. 3B. FIG. 3B shows a reproduction waveform example of the recording signal, and a ratio of distortion amount B with respect to magnitude A of the reproduction wave form is defined as a distortion ratio shown in FIG. 4C, which will be described later.

Next, importance of the recording power ratio will be explained. First, a description will be simply given of examined parameter below.

Figure 4A:
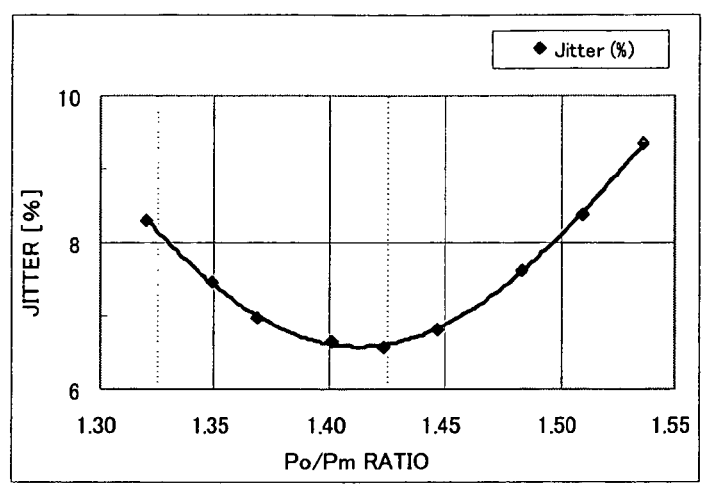
FIGS. 4A to 4C are graphs showing relations between a recording power ratio (Po/Pm ratio) and jitter, asymmetry, a modulation degree and a distortion ratio.

"Jitter" is a value indicating a fluctuation degree of rise-up and fall-down edges of a binarized reproduction signal, with respect to a PLL clock generated from the binarized reproduction signal. As the jitter is higher, the quality of the reproduction signal is worse. Conversely, as the jitter is lower, the quality of the reproduction signal is better. According to a DVD-R standard book, the jitter value: smaller than 8.0% is necessary. FIG. 4A shows a relation between the recording power ratio (Po/Pm ratio) and the jitter. It is understood that the more the recording power ratio is shifted with respect to the optimum value, the worse the jitter becomes.

"Asymmetry" is a value indicating a shift degree of the magnitude center between the minimum recording mark (3 T mark) and the maximum recording mark (14 T mark), and according to the DVD-R standard book, the asymmetry: −0.05 to 0.15 is necessary.

"Modulation (I14H)" is a value indicating a ratio ($I_{14}/I_{14H}$) of a magnitude $I_{14}$ of the reproduction signal correspondent to the maximum recording mark and a difference $I_{14H}$ between the peak value and zero level of the reproduction signal correspondent to the maximum recording mark (14T mark). According to the DVD-R standard book, the modulation: equal to or larger than 0.60 (60%) is necessary.

Figure 4B:
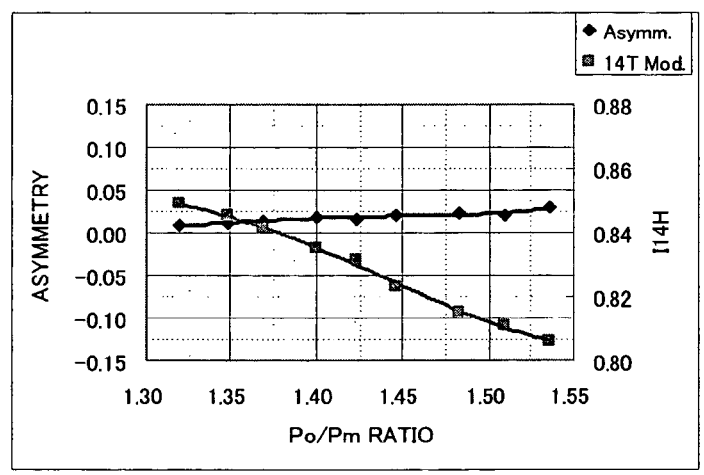

FIG. 4B shows a relation among the recording power ratio, the asymmetry and the modulation. From FIG. 4B, it is understood that when the recording power ratio changes, the value of the asymmetry maintains almost constant, and when the recording power ratio is small, the modulation of the recording signal becomes large. This may give an adverse effect to ROPC (Running Optimum Power Control), which is not preferred. In addition, when the recording power ratio becomes large, the modulation becomes small, and S/N becomes worse.

Figure 4C:
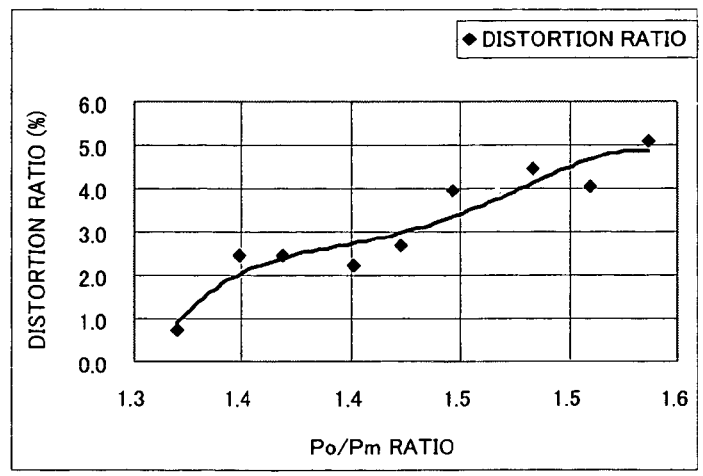

FIG. 4C shows a relation between the recording power ratio and a distortion ratio of the recording waveform. It is understood that when the recording power ratio becomes larger than the optimum value, the distortion ratio becomes large.

[Calibration of Recording Power]

As described above, when the recording power ratio Po/Pm is shifted with respect to the optimum value, the recording characteristic becomes worse. Therefore, before the emission of the recording pulse, the calibration of the laser light power is performed so that the recording power ratio Po/Pm becomes the optimum value. Concretely, in such a state that the laser light power emitted from the LD 13 is varied, the output value from the FMD 21 is detected. The output value of the FMD 21 is in proportion to the laser light power emitted from the LD 13. Thus, in order to make the recording power ratio the optimum value, the current value may be set to the LD driver 11 so that the ratio of the output value of the FMD 21 becomes the desired value at the recording powers Po and Pm.

Now, by prescribing that the power control unit 31 includes the sample hold circuit, such a case that the above calibration is executed by the sample hold circuit is assumed. The laser light waveform to be emitted at the time of the information recording is shown in FIG. 3A. However, since the time widths of the top pulse 201 and the last pulse 203 in the laser light waveform are actually short, it is difficult to detect the level Po in the period by the sample hold circuit. Therefore, as for each of the levels Po and Pm, a rectangular waveform different from that shown in FIG. 3A is emitted, and the output value of the FMD 21 at this time is detected. Then, the calibration of the laser light power is performed so that the laser light power becomes the desired recording power ratio Po/Pm.

An example of the rectangular wave (hereinafter referred to as "light waveform for calibration") used for the calibration is shown in FIG. 6A. In FIG. 6A, a horizontal axis indicates time, and a vertical axis indicates the laser power detecting signal 16 (see FIG. 2) outputted from the FMD 21. For convenience, as for the vertical axis, the low side of the waveform is shown as the high power side, and the upper side thereof is shown as the low power side. In this embodiment, an NRZ (Non-Return-to-Zero) signal at the speed for recording the actual information (actual recording data) is used for the time interval of the light waveform for the calibration used for the calibration.

Concretely, as for a DVD, the time interval forming the above light waveform for the calibration is determined from 3 T–11 T and 14 T by prescribing "T" as the time interval of 1-channel clock. In the example of FIG. 6A, the high power side corresponds to the mark of the recording information, which is shown by "M". In addition, the low power side corresponds to the space of the recording information, which is shown by "S". In the example of the light waveform for the calibration shown in FIG. 6A, 1 period includes a combination "11TM–14TS–3TM–14TS". "11TM" indicates the mark of the length of 11 T, and "14TS" indicates the space of the length of 14 T. The sample hold circuit detects the level at timing 71 as the detected laser power value 19 (see FIG. 2) during the 11TM period being the high power period for the calibration.

The predetermined current value is set to the LD driver 11, and the laser light is emitted from the LD 13. At this time, the detected laser power value 19 is obtained from the laser power detecting signal 16 from the FMD 21 by the sample hold circuit. When this work is performed for plural different current values, a relation between the current setting value to the LD driver 11 and the laser light output from the LD 13 (i.e., an I-P characteristic of the power in correspondence with the current) can be obtained.

Figure 5:
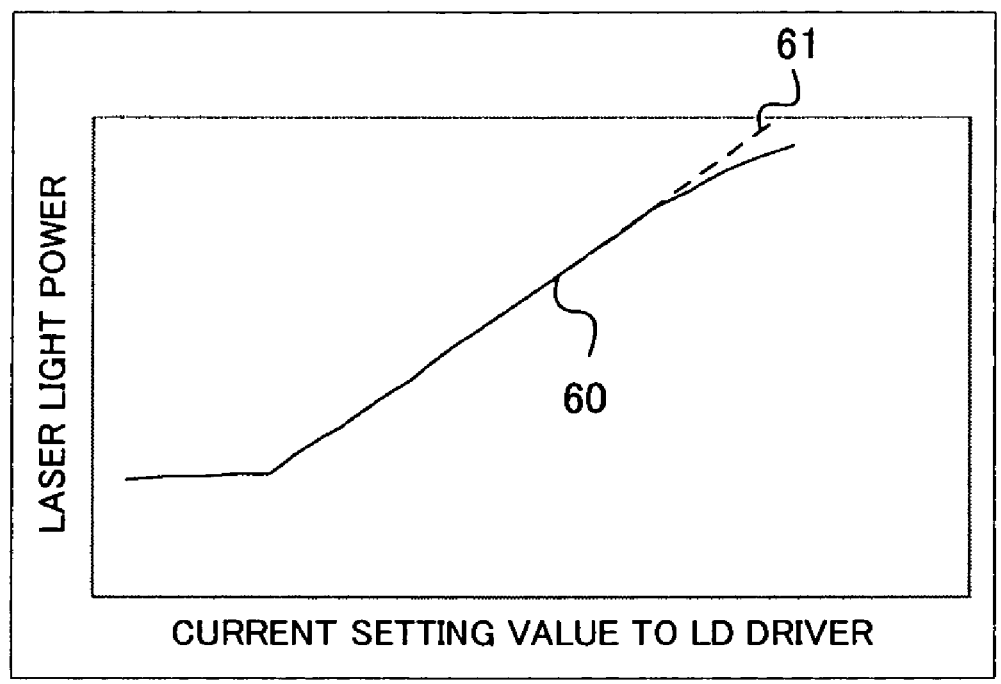
FIG. 5 is a graph showing a relation between a current setting value to an LD driver and a laser light power.

FIG. 5 shows an example of the I-P characteristic. In an I-P characteristic 60 shown in FIG. 5, linearity is lost in the high output power area. Namely, when the I-P characteristic has the linearity, the characteristic in the high output power area becomes a broken line 61. However, as for the actual I-P characteristic 60, the light output power decreases in the high output power area. Therefore, the calibration is performed at plural points in the high output power area, and the relation between the current setting value to the LD driver 11 at this time and the FMD output value, i.e., the I-P characteristic, is ensured. Based on the I-P characteristic thus obtained, the laser emission is performed. Thereby, it becomes possible to vary the output power in a state of maintaining the ratio of the recording power ratio Po/Pm.

Next, a description will be given of the control of the emission duty of the above-mentioned light waveform for the calibration. When the recording speed onto the optical disc becomes high, the time interval on the high power side of the light waveform for the calibration shown in FIG. 6A becomes short in the above-calibration. Therefore, so as to detect the level in the period by the sample hold circuit, it becomes necessary that the light waveform for the calibration is formed by the long NRZ signal, e.g., the data length of 11 T and 14 T, in consideration of a circuit restriction.

When the rated output value of the LD 13 is determined, the laser light waveform (peak-to-peak value, the emission duty and the time interval) actually used (which is requested by the optical disc subjected to the information recording in this case) is counted. Thus, if the same laser light waveform as that at the time of the actual information recording is emitted, the emission duty of the laser light never becomes larger than the rated output value of the LD 13 within the range of the power necessary for the target recording.

Generally, the maximum output value of the laser element is defined by the width of the pulse emission part and the emission duty. For example, an example of the rated output value of the LD 13 used for the information recording apparatus of the optical disc is as follows.

$$250\ mW@30\ ns(Duty:37.5\%)/215\ mW@130\ ns(Duty:38.0\%)$$

"Rated output value" indicates a rated value (a unit thereof is "mW") of the light pulse output of the laser in the predetermined pulse width and the emission duty.

However, at the high-speed recording, since the necessary laser light power for the information recording is increased with the increase of the recording speed, it can be happen that the emission duty may become larger than the rated output value of the LD 13 at the time of the calibration. For example, when the light waveform for the calibration includes the repeat of "6TM–6TS" and the emission duty of the laser light is set to 50%, the emission duty may problematically become larger than the rated output value of the LD 13.

Therefore, in the present invention, as shown in FIG. 6A, the emission pattern forming the light waveform for the calibration is formed in consideration of the emission duty of the laser light. Concretely, by the combination of the time width (NRZ signal time width) of the actual recording data used for the actual recording, the light waveform for the calibration is formed so that the laser light power does not become larger than the rated output value of the LD 13. Thereby, it becomes possible to perform the calibration in the using state suitable for the rated output value of the laser element (LD13).

Concretely, in the example of FIG. 6A, the light waveform for the calibration includes the combination of the time width of "11TM–14TS–3TM–14TS". The emission duty of the laser light in this case is as follows.

$$\{(11+3)/(11+14+3+14)\}\times 100=33.3[\%]$$

In addition, it is preferable that the emission duty of the laser light is equal to or smaller than the substantial recording power duty. "Substantial recording power duty" is the emission duty of the laser light at the time of recording of the actual recording data. For example, when "3 T mark" is recorded as the actual recording data, the actual laser diode emits the light for the time width of 2 T. Additionally, when "6 T mark" is recorded as the actual recording data, the actual laser diode emits the light for the time width of 4.5 T. Thus, by making the emission duty of the laser light equal to or smaller than the substantial recording power duty, the test emission can be effectively performed within the range of the emission duty of the laser light occurring at the time of the recording of the actual data.

Next, a description will be given of a method of reducing the emission duty of the laser light. As shown in FIG. 6B, by forming the light waveform for the calibration as the combination of "11TM–14TS–3TM–14TS–3TM–14TS", the emission duty of the laser light can be further reduced to 28.8%. Thereby, the margin can be ensured with respect to the example (the emission duty 33% of the laser light) of FIG. 6A, which is set in correspondence to the rated output value of the LD 13.

In addition, as the method of reducing the emission duty of the laser light, the emission of the laser light can be temporarily stopped. For example, as shown in FIG. 6C, the same light waveform for the calibration as that of FIG. 6A is used, and the laser emission is stopped during the period of 3TM, which is shown by the hatched area 72. Thereby, the period of 31TS (=14TS+3TS+14TS) can be substantially formed. In this case, the light waveform for the calibration substantially includes the repeat of "11TM–31TS", and thus the emission duty of the laser light can be reduced to 26.2%.

As described above, in the present invention, since the light waveform for the calibration used for the calibration of the laser light power is formed to have the desired emission duty by the combination of the time width (e.g., 3 T–11 T and 14 T) of the actual recording data, the calibration can be performed within the rated output value of the LD 13, further preferably within the substantial recording power duty. Actually, since the laser light waveform (peak-to-peak value, the emission duty and the time interval) to be emitted becomes different at each recording speed even if the optical disc is the same, the light waveform for the calibration is designed and prepared at each recording speed.

[Power Calibration Process]

Figure 7:
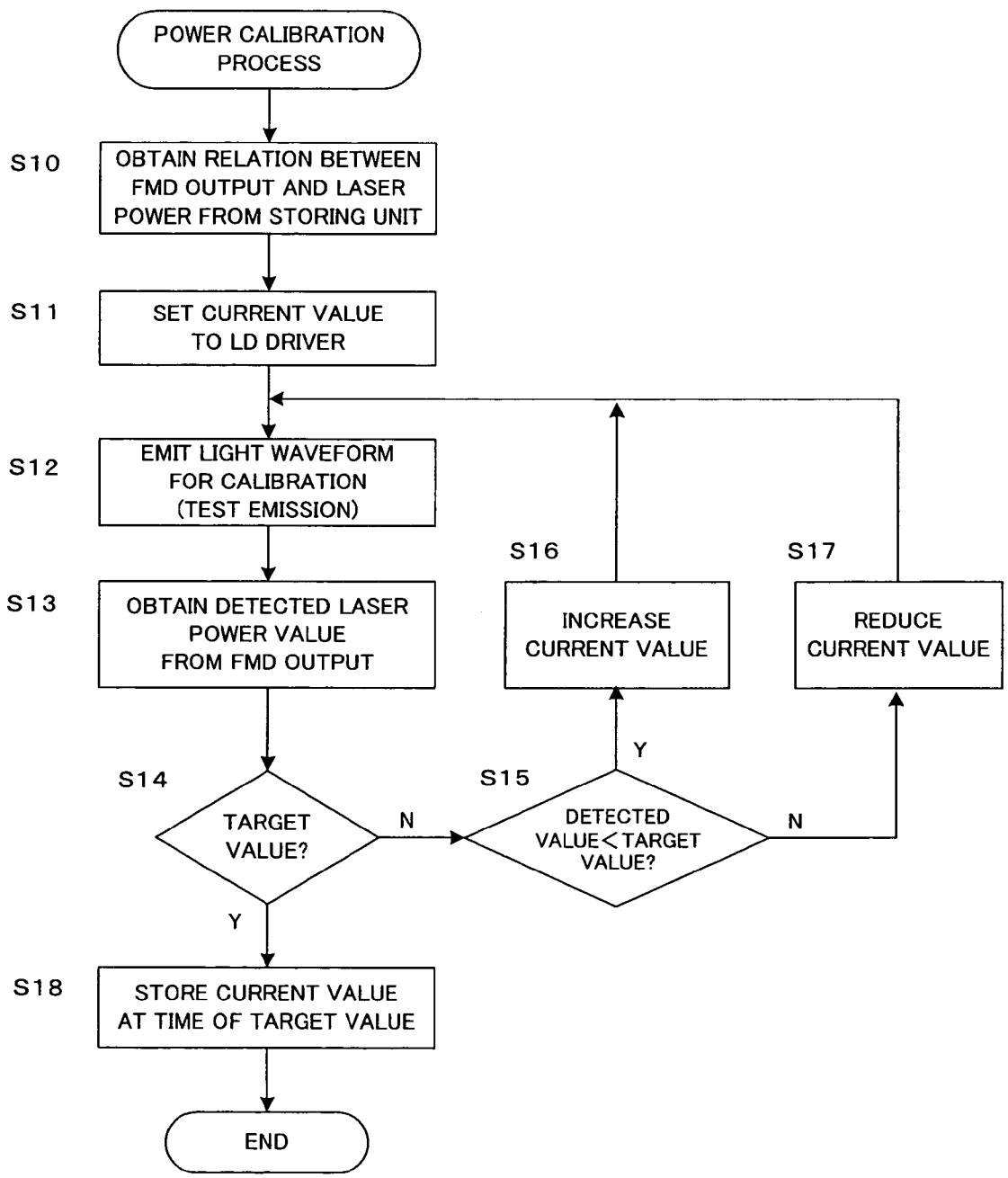
FIG. 7 is a flowchart of a power calibration process.

Next, a description will be given of a concrete example of the power calibration process. FIG. 7 is an example of a flow chart of the power calibration process. The power calibration process is a process of obtaining the current setting value to the LD driver 11 in correspondence to a desired laser light power value. By executing this process for the plural laser light power values, the I-P characteristic shown in FIG. 5 can be obtained, and the actual recording can be performed by the accurate laser light power (i.e., the recording power ratio) based on the I-P characteristic. The system control unit 32 shown in FIG. 2 executes the predetermined program and controls the power control unit 31. Thereby, the process is realized.

Now, a description will be given of such a case that the desired laser light power value is prescribed as Po shown in FIG. 3A, for convenience. First, the system control unit 32 reads, from the storing unit 34, the relation between the FMD output value and the laser light power at the time of the manufacture adjustment of the information recording apparatus 1 (step S10). Next, the power control unit 31 sets the predetermined current value to the LD driver 11 (step S11). At the same time, the power control unit 31 makes the LD 13 emit the light waveform for the calibration having the emission duty within the rated output value of the LD 13 or within the substantial recording power duty (step S12). This is referred to as "test emission". The light waveform for the calibration is prepared for each kind of the optical disc and at each recording speed.

The power control unit 31 obtains the detected laser power value 19 (see FIG. 2) on the high power side of the FMD output corresponding to the light waveform for the calibration at the timing 71 shown in FIG. 6A (step S13). This detected laser power value 19 is transmitted to the system control unit 32 from the power control unit 31. The system control unit 32 determines whether or not the detected laser power value 19 coincides with the target value (Po in this example) (step S14). The target value may be a value having a width to some extent. In this case, when the detected laser power value 19 is within the range of the width, it is determined that it coincides with the target value.

When the detected laser power value 19 outputted from the FMD 21 does not coincide with the target value, the system control unit 32 controls the power control unit 31. When the detected laser power value 19 is smaller than the target value, the current value is increased (step S16). When the detected laser power value 19 is larger than the target value, the current value is reduced (step S17). The process returns to step S12, and steps S12 to S14 are repeated. In this manner, when the detected laser power value 19 obtained by the sample hold circuit coincides with the target value (Po in this example) (step S14; Yes), the system control unit 32 stores the current value supplied to the LD driver 11 at this time.

In this manner, it becomes possible to obtain the current setting value to be supplied to the LD driver 11 in order to obtain the desired laser light power (Po in this example). This means that one point corresponding to the desired laser light power (Po in this example) on the I-P characteristic shown in FIG. 5 is obtained. Therefore, by the same method, the correspondent current setting value is further obtained as for another desired laser light power. When the information is recorded onto the optical disc by the light waveform shown in FIG. 3A, the calibration process shown in FIG. 7 is executed for the laser light powers Po and Pm included in the light waveform, and thereby the current setting values corresponding to the laser light powers Po and Pm may be obtained, respectively. For example, it is assumed that the current setting values to the LD 13, corresponding to the laser light powers Po and Pm are obtained as Io and Im, respectively. In this case, at the time of the actual recording, in the light waveform shown in FIG. 3A, the current Io is supplied to the LD driver 11 during the top pulse 201 and the last pulse 203, and the current Im is supplied to the LD driver 11 during the intermediate pulse portion 202. Thereby, the recording can be performed in such a state that the recording power ratio (Po/Pm ratio) is accurately maintained.

As described above, in this embodiment, at the time of the information recording onto the optical disc, the calibration of the laser light power is executed so that the recording power ratio Po/Pm becomes the optimum value. At this time, the LD 13 is driven and the test emission is performed by using the light waveform for the calibration produced such that the emission duty is within the rated output value of the LD 13, preferably the substantial recording power duty being the emission duty of the laser light at the time of the recording of the actual recording data. Thus, the calibration can be safely and stably performed under a condition suitable for the rated output value of the LD 13.

The actual emission pattern (time width forming the waveform) of the light waveform for the calibration is chosen from the actual data lengths (e.g., 3 T–11 T and 14 T) in order to remove the difference with the actual recording. In the actual choice, choosing as short data length as possible is preferred in order to form the light waveform for the calibration having the small emission duty. However, since, as the data length becomes shorter, the time width also becomes shorter (particularly in the high-speed recording), such probability that the sample-holding accuracy becomes low increases. Therefore, actually, by using the short data length within the range capable of ensuring the sample-holding accuracy, it becomes possible to generate the light waveform for the calibration having the desired emission duty. For example, in a case of 16-times speed recording of the DVD, the emission pattern of "11TM–14TS–3TM–14TS" shown in FIG. 6A can be used. In a case of 12-times speed recording, the emission pattern of "9TM–14TS–3TM–14TS can be used.

[Modification]

In the above embodiment, by the sample hold circuit provided in the power control unit 31, the FMD output value of the period 71 on the high power side of the light waveform for the calibration is detected as the detected laser power value 19, as shown in FIG. 6A. Instead of the sample hold circuit, the peak hold circuit may be used to obtain the detected laser power value 19, for example.

In the above embodiment, the optical disc 2 and the recorder according to the optical disc 2 are explained as an example of the information recording medium and an example of the information recording apparatus, respectively. However, the present invention is not limited to the optical disc and the recorder thereof. Namely, the present invention is also applicable to various kinds of information recording media and recorders therefor corresponding to high density recording or high-transmitting rate.

INDUSTRIAL APPLICABILITY

This invention is usable for information recording onto the optical disc such as the DVD-R/RW, the DVD+R/RW, the Blu-ray disc, an AOD (Advanced Optical Disc) and the CD-R/RW.

The invention claimed is:

1. An information recording apparatus comprising:
a pickup which includes a laser light source;
a light receiving unit which receives a laser light emitted from the laser light source and detects light receiving amount;
a power control unit which controls a power of the laser light based on the light receiving amount;
a test emission unit which executes test emission of the laser light according to a light waveform for calibration before actual information recording; and
a duty control unit which controls emission duty of the laser light within a range smaller than a rated output value of the laser light source at the time of the test emission, the emission duty being a ratio of a time period for emitting the laser light to one period of the light waveform for calibration,
wherein the duty control unit controls the emission duty of the laser light such that the emission duty is smaller than a substantial recording power duty, the substantial recording power duty being the emission duty of the laser light at the time of recording actual recording data.

2. The information recording apparatus according to claim 1, wherein the duty control unit controls the emission duty of the laser light at each recording speed.

3. The information recording apparatus according to claim 1, wherein the duty control unit controls the emission duty of the laser light by controlling an emission pattern of the laser light.

4. The information recording apparatus according to claim 3, wherein the duty control unit generates the emission pattern by a combination of data length of actual recording data.

5. The information recording apparatus according to claim 4, wherein, as the emission duty is set to a smaller value, the duty control unit uses a combination including actual recording data of short data length.

6. The information recording apparatus according to claim 5, wherein the power control unit includes a hold circuit for holding a level of the light receiving amount, and wherein the duty control unit uses a combination including actual recording data of data length in which the hold circuit can hold the level.

7. An information recording method executed in an information recording apparatus comprising a pickup which includes a laser light source; and a light receiving unit which receives a laser light emitted from the laser light source and detects light receiving amount, comprising:
a power control process which controls a power of the laser light based on the light receiving amount; and
a test emission process which executes test emission of the laser light before actual information recording,
wherein the test emission process controls emission duty of the laser light within a range smaller than a rated output value of the laser light source at each recording speed,
wherein the duty control unit controls the emission duty of the laser light such that the emission duty is smaller than a substantial recording power duty, the substantial recording power duty being the emission duty of the laser light at the time of recording actual recording data.

8. A tangible computer-readable medium with a computer program recorded thereon executed in an information recording apparatus comprising a pickup which includes a laser light source; a light receiving unit which receives a laser light emitted from the laser light source and detects light receiving amount; and a computer, making the computer function as:
a power control unit which controls a power of the laser light based on the light receiving amount;
a test emission unit which executes test emission of the laser light according to a light waveform for calibration before actual information recording; and
a duty control unit which controls emission duty of the laser light within a range smaller than a rated output value of the laser light source at the time of the test emission, the emission duty being a ratio of a time period for emitting the laser light to one period of the light waveform for calibration,
wherein the duty control unit controls the emission duty of the laser light such that the emission duty is smaller than a substantial recording power duty, the substantial recording power duty being the emission duty of the laser light at the time of recording actual recording data.

* * * * *